US008179111B2

(12) United States Patent
Akyildiz et al.

(10) Patent No.: US 8,179,111 B2
(45) Date of Patent: May 15, 2012

(54) METHODS, SYSTEMS, AND DEVICES FOR POWER-ON SEQUENCE FOR A CIRCUIT

(75) Inventors: Ahmet Akyildiz, Saratoga, CA (US); Alexei Shkidt, Newark, CA (US); Gregory Jon Richmond, Cupertino, CA (US)

(73) Assignee: Silicon Labs Spectra, Inc., Sunnyvale, CA (US)

( * ) Notice: Subject to any disclaimer, the term of this patent is extended or adjusted under 35 U.S.C. 154(b) by 495 days.

(21) Appl. No.: 12/421,685

(22) Filed: Apr. 10, 2009

(65) Prior Publication Data

US 2009/0256541 A1 Oct. 15, 2009

Related U.S. Application Data

(60) Provisional application No. 61/044,010, filed on Apr. 10, 2008.

(51) Int. Cl.
*G05F 1/10* (2006.01)

(52) U.S. Cl. ....................................................... 323/283

(58) Field of Classification Search .................. 323/268, 323/282–285
See application file for complete search history.

(56) References Cited

U.S. PATENT DOCUMENTS 6,894,465 B2 * 5/2005 Sutardja et al. ............... 323/268

* cited by examiner

*Primary Examiner* — Adolf Berhane
*Assistant Examiner* — Yemane Mehari
(74) *Attorney, Agent, or Firm* — O'Keefe, Egan, Peterman & Enders LLP

(57) ABSTRACT

Methods, systems, and devices are described for a power-on sequence for a circuit. A sequence generator for an electronic system may control various power domains to enter known states and prevent unwanted states as other domains of the system power-up. Regulator modules may be controlled to remain in an inoperable state until a reference voltage stabilizes at a predetermined reference level. The regulator modules regulate a received voltage supply to output a regulated voltage at the reference level, the regulated voltage set via a comparison to the reference voltage. Various analog and digital modules may be controlled to remain in an known state until the regulated voltage stabilizes at substantially the reference level. Additional sequencing is described for other dependencies, as well.

31 Claims, 8 Drawing Sheets

300

METHODS, SYSTEMS, AND DEVICES FOR POWER-ON SEQUENCE FOR A CIRCUIT

CROSS-REFERENCES TO RELATED APPLICATIONS

This application claims priority from U.S. Provisional Patent Application No. 61/044,010, filed Apr. 10, 2008, entitled "POWER SEQUENCE TECHNIQUE", which is hereby incorporated by reference, as if set forth in full in this document, for all purposes.

BACKGROUND OF THE INVENTION

The present invention relates to electronic circuits in general and, in particular, to power sequencing techniques. As process dimensions for integrated circuits continue to shrink, the maximum operating voltage supplied to the circuits may decrease in a corresponding fashion. Reduction of the maximum operating voltage prevents large electric fields from damaging circuit structures such as gate oxide, diffusion depletion regions, and various insulating layers. However, in many cases, external, system operating voltages have not decreased as rapidly as required by semiconductor technologies with reduced geometries. Therefore, integrated circuits manufactured in advanced semiconductor technologies typically include voltage regulators which are supplied by higher voltages, but output a lower voltage that is compatible with the maximum operating voltage of a particular semiconductor technology.

Additionally, sets of one or more regulators may be included in separate power domains, so that noise coupling from one portion of the circuit to another may be prevented. In addition, there may be functions that are powered in one supply domain and then shared with a circuit that is powered in a separate power domain. For example, a voltage and current reference may supply reference voltages and current to other analog circuits. Another example includes digital control signals that are generated in one power domain but are used to control other digital or analog functions in a separate power domain. Because of these dependencies, novel power sequencing techniques may be desirable to avoid errors and ensure efficient power-on or power-down.

SUMMARY

Methods, systems, and devices are described for a power-on sequence for a circuit. A sequence generator for an electronic system may control various power domains to enter known states and prevent unwanted states as other domains of the system power-up. In one embodiment, a reference voltage generator receives a supply voltage, and outputs a reference voltage at a lower, reference level. One or more regulator modules may be controlled to remain in an inoperable state until the reference voltage stabilizes at substantially the reference level. The regulator modules regulate a received voltage supply to output a regulated voltage at substantially the reference level, the regulated voltage set via a comparison to the reference voltage. Various analog and digital modules may be controlled to remain in a known state until the regulated voltage stabilizes at substantially the reference level. Additional sequencing is described for other dependencies, as well.

In one embodiment, a circuit with a power-up sequence is described. A reference voltage generator outputs a reference voltage at a second level lower than a voltage supply at a first level. Regulator modules may receive the voltage supply at the first level, and regulate the received voltage supply to output a regulated voltage at substantially the second level, the regulated voltage level set via a comparison to the reference voltage. Digital modules are configured to be powered via the regulated voltage, and may further be configured to control aspects of various analog modules. These analog modules receive voltage supply at substantially the first level, and receive control signals from the one or more digital modules. A control module may force the regulator modules to remain in an inoperable state until the reference voltage stabilizes at the second level, and force the digital and analog modules to remain in an inoperable (or other known) state until the regulated voltage level stabilizes at substantially the second level. The digital modules may be configured to provide additional sequencing and validation.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
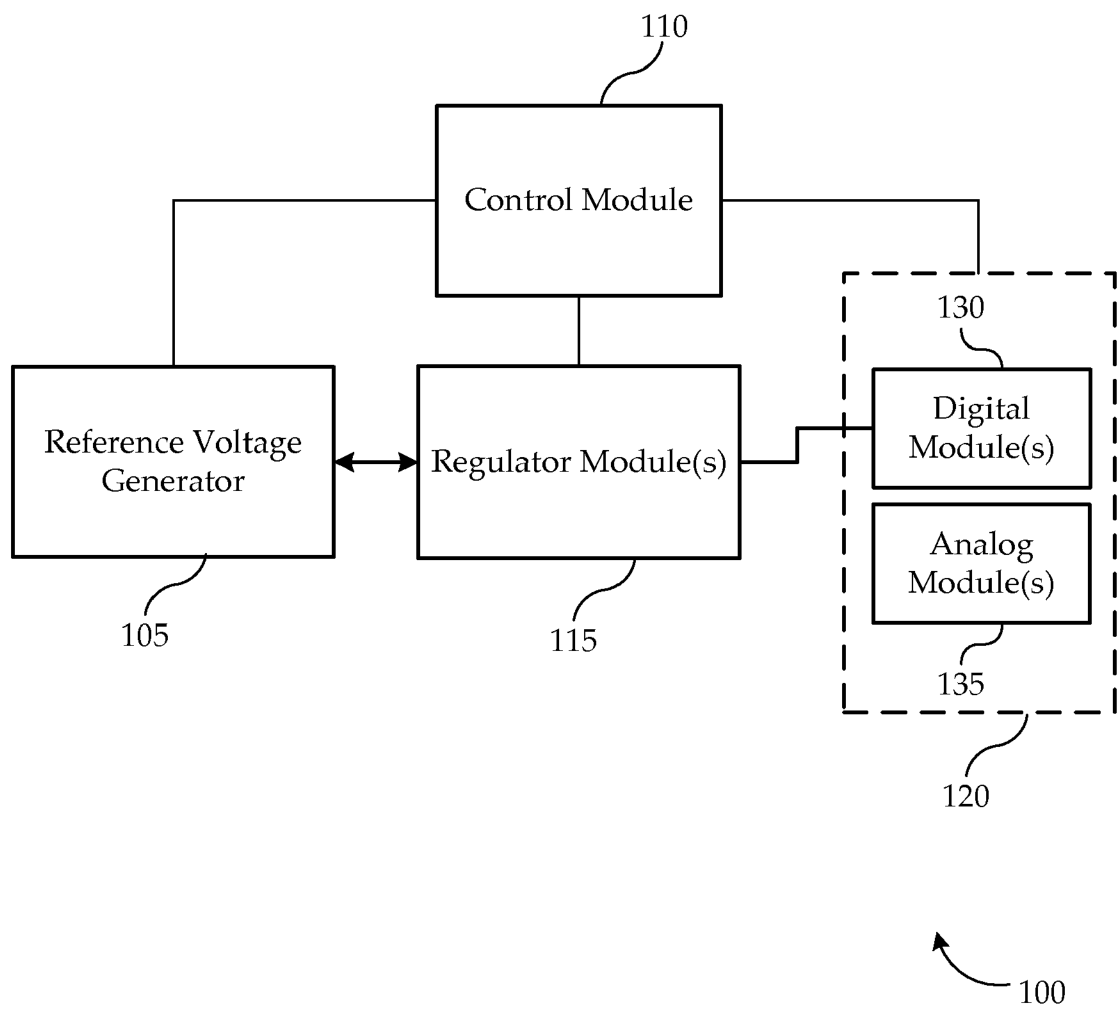
FIG. 1 is a generalized block diagram showing a circuit configured according to various embodiments of the invention.

A circuit configuration is described to provide and control a supply of power to separate power domains across the circuit. In one embodiment, the circuit is configured for clock generation. Various sequences of control signals, power-on reset signals, and verifying signals of available power levels between the functional blocks are described. For example, control signals may be produced to force a number of blocks to remain disabled during parts of the power-up process. The control signals may be sequenced to ensure that no faulty signaling or inappropriate internal states are produced in the associated circuitry. In this way, direct sequencing of the power-up of the functional blocks is undertaken so that proper internal states may be maintained across power domain boundaries.

A power sequence system, according to one embodiment of the invention, includes a main power-on-reset circuit coupled to a main power supply and a reference voltage generator. At system start-up and after receiving a certain voltage level, the main power-on-reset circuit generates a power-on reset signal which is received by the reference voltage generator. After sufficient time for the reference voltage generator to produce a valid reference voltage level, an enabling signal is provided to a voltage regulator coupled to the reference voltage generator. After achieving a regulated core voltage level, a core-logic power-on-reset circuit produces an enabling signal to a power sequence controller. The power sequence controller receives various feedback signals from and generates control signals to digital core-logic circuitry. Sequential control signals and voltage level validations between the sequentially coupled main power-on-reset circuit, the reference voltage generator, voltage regulator, and digital circuitry provide for powering-on and powering-down to avoid erroneous states.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Referring first to FIG. 1, a block diagram is shown illustrating an example circuit configuration 100 according to various embodiments of the invention. This configuration 100 may be a clock generator, or may be utilized for configuration of a number of different types of circuits. The configuration includes a reference voltage generator 105, a control module 110, one or more regulator modules 115, and additional components 120. The additional components may include one or more digital modules 130 and/or one or more analog modules 135, which may be in any number of power domains.

Upon power-up, a reference voltage generator 105 (e.g., a bias circuit or other circuit configured to output a voltage that may be used as a reference by other circuits) is configured to generate reference voltage (e.g., 1.8V), which may be lower than its supply voltage (e.g., 3.3 V). As the reference voltage generator 105 is starting up, it may be monitored (e.g., internally, or by the control module 110) to determine when the reference voltage stabilizes at or about the reference voltage level (e.g., 1.8V).

The control module 110 may force the one or more regulator modules 115 to remain in an inoperable state until the regulated voltage level stabilizes at substantially the reference voltage level. The control module 110 may generate (or cause the generation of) an enable regulator signal to activate the one or more regulator modules 115, the generation of the enable regulator signal triggered when a reference voltage stabilizes at substantially a reference level.

The regulator modules 115 may be configured to receive voltage supply at the higher voltage level (e.g., 3.3V), and regulate the received voltage supply to output a regulated voltage at the lower level (e.g., 1.8V). The regulator modules 115 may set the regulated voltage level set via a comparison to the reference voltage.

The illustrated configuration 100 also includes one or more digital modules 130 which are configured to be powered via the regulated voltage, and generate control signals for other digital and analog blocks. The illustrated configuration 100 also includes one or more analog modules 135 which are configured to be powered via the higher voltage supply, and receive control signals from the one or more digital modules.

The control module 110 may control all, or a subset, of the one or more digital modules 130 and/or the one or more analog modules 135 to remain in a known state (e.g., using one or more control signals) until the regulated voltage level stabilizes at substantially the second voltage level. By way of example, the control module 110 may force the one or more digital modules 130 and/or the one or more analog modules 135 to remain in an inoperable state until the regulated voltage level stabilizes at substantially the reference voltage level. In another embodiment, the control module 110 may prevent power-down operations from occurring at the digital modules 130 and/or analog modules 135 (e.g., the reference voltage generator) until the regulated voltage level stabilizes at substantially the reference voltage level.

As the regulator modules 115 are starting up, they may be monitored (e.g., internally, or by the control module 110) to determine when the reference voltage stabilizes at or about the reference voltage level (e.g., 1.8V). The control module 110 may, upon the determination, generate one or more control signals to release the forced state. In one embodiment, a single control signal may release certain inoperable states and release certain power-down prevention states; in other embodiments, there may be additional control signals. The control module 110 may, upon the release or thereafter, activate the controlled digital or analog modules 130, 135 in a sequence to ensure that each enters a valid state and transmits valid control signals.

The control module 110 may be a stand alone module, or may be integrated into other functional units (e.g., functions of the control module 110 may be integrated into the reference voltage generator 105 or the regulator modules 115). Therefore, the functionality of the control module 110 may be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 2:
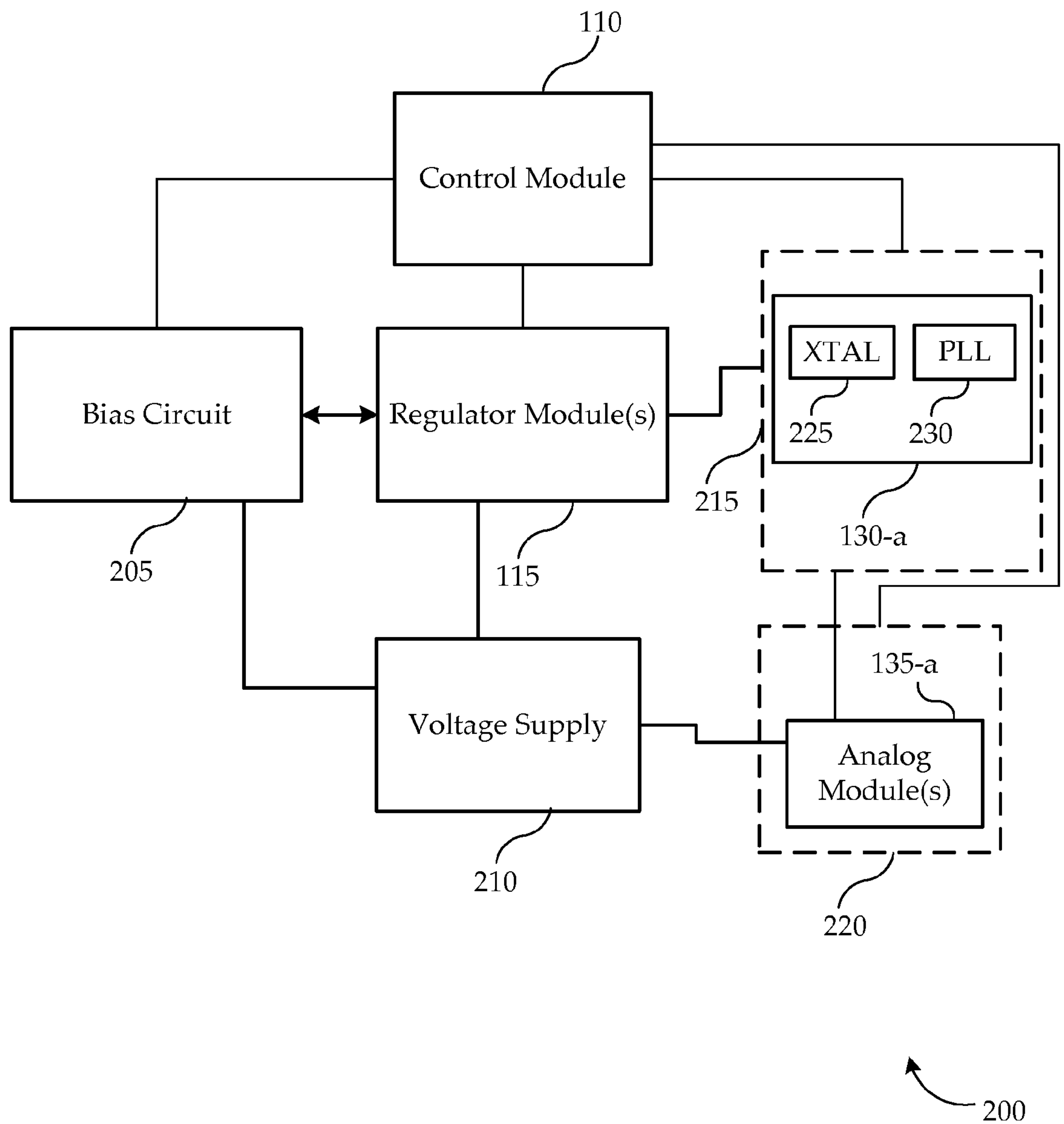
FIG. 2 is a generalized block diagram showing an alternative architecture for a circuit configured according to various embodiments of the invention.

Referring next to FIG. 2, a block diagram is shown illustrating an example circuit configuration 200 according to various embodiments of the invention. This configuration 200 may be a clock generator, or may be utilized for configuration of a number of different types of circuits. The configuration includes a bias circuit 205, a control module 110, one or more regulator module(s) 115, one or more digital modules 130-*a* in a first set of one or more power domains 215, one or more analog modules 135-*a* in a second set of one or more power domains 220. The digital modules include input buffers 225 for a crystal oscillator, and a digital phase-locked loop PLL 230. A voltage supply 210 may supply higher voltage to the bias circuit 205, one or more regulator module(s) 115, and one or more analog modules 135-*a*, while the regulators may power the one or more digital modules 130-*a*.

The configuration 200 may be the circuit configuration 100 of FIG. 1. It is worth noting that the bias circuit 205 may be the reference voltage generator 105 of FIG. 1. The regulator module(s) 115 may include a core regulator, crystal oscillator regulator, and phase-locked loop regulator (each of which powers a different power domain). The digital modules 130-*a* may include input buffers for the crystal oscillator and a related reference frequency counter, a PLL and PLL lock detector, and other digital circuits.

Upon power-up, a bias circuit 205 generates a reference voltage (e.g. 1.8V), which may be lower than its supply voltage (e.g., 3.3V) from voltage supply 210. As the bias circuit 205 is starting up, it may be monitored (e.g., internally, or by the control module 110), to determine when the reference voltage at each, or a subset, of the regulator modules 115 stabilizes at or about the reference voltage level (e.g., 1.8V).

As above, the control module 110 may force the one or more regulator modules 115 to remain in an inoperable state until the regulated voltage level stabilizes at substantially the reference voltage level. For this forced state, the control module 110 may transmit one or more control signals (e.g., a single bi-level control signal) to the one or more regulator modules 115. The control module 110 may generate (or cause the generation of) an enable regulator signal to activate all, or a subset, of the one or more regulator modules 115, the generation of the enable regulator signal triggered when a reference voltage stabilizes at substantially a reference level (e.g., the enable regulator signal may be a second state of the control signal forcing the state, or may be a different signal).

The regulator modules 115 may be configured to be powered from the voltage supply 210 at the higher voltage level (e.g., 3.3V), and each may regulate the received voltage supply 210 to output a regulated voltage at the lower level (e.g., 1.8V). The regulator modules 115 may set the regulated voltage level set via a comparison to the reference voltage.

The illustrated configuration 200 also includes one or more digital modules 130-*a* which are configured to be powered via the regulated voltage, and generate control signals for other digital and analog blocks. The configuration 200 illustrates digital modules 130-*a* which include input buffers 225 for a crystal oscillator and include a digital PLL 230. The illustrated configuration 200 also includes one or more analog modules 135 which are configured to be powered via the higher voltage supply, and receive control signals from the one or more digital modules.

The control module 110 may control all, or a subset, of the one or more digital modules 130-*a* and/or the one or more analog modules 135-*a* to remain in a known state (e.g., using one or more control signals) until the regulated voltage level stabilizes at substantially the second voltage level. The control module 110 may use separate control signals for the digital modules 130-*a* and the analog modules 135-*a* (e.g., separate bi-level control signals for each). Alternatively, the control signals may be divided along other lines (e.g., control signals including a bi-level higher voltage 3.3V signal and a bi-level lower voltage 1.8V signal). By way of example, the control module 110 may force the one or more digital modules 130-*a* and/or the one or more analog modules 135-*a* to remain in an inoperable state until the regulated voltage level stabilizes at substantially the reference voltage level. In another embodiment, the control module 110 may prevent power-down operations from occurring at the digital modules 130-*a* and/or analog modules 135-*a* (e.g., the reference voltage generator) until the regulated voltage level stabilizes at substantially the reference voltage level.

As the regulator modules 115 are starting up, they may be monitored (e.g., internally, or by the control module 110), to determine when the reference voltage stabilizes at or about the reference voltage level (e.g., 1.8V). The control module 110 may, upon the determination or thereafter, generate one or more control signals to release the known state. In one embodiment, a single control signal may release certain inoperable states and release certain power-down prevention states; in other embodiments, there may be additional control signals.

The control module 110 may, after the release, activate the controlled digital or analog modules 130, 135 in a sequence to ensure that each enters a valid state and transmits valid control signals. For example, a control signal may be transmitted to enable a crystal oscillator and associated input buffer 225, and another control signal may transmitted to enable a counter (e.g., part of the digital modules 130-*a*) configured to monitor an output of the crystal oscillator. The counter may determine when an output of the crystal oscillator exceeds a threshold performance measurement. When this occurs, yet another control signal may be transmitted to enable a digital phased-locked loop 230 which receives the output of the crystal oscillator. Another control signal may enable a phase-locked loop detector (e.g., part of the digital modules 130-*a*) which monitors an output of the phase-locked loop 230 to determine when the output exceeds a threshold performance measurement. The phase-locked loop detector may transmit, after the threshold determination for the crystal oscillator output, another control signal causing output buffers, or other circuit elements, to be enabled.

Figure 3:
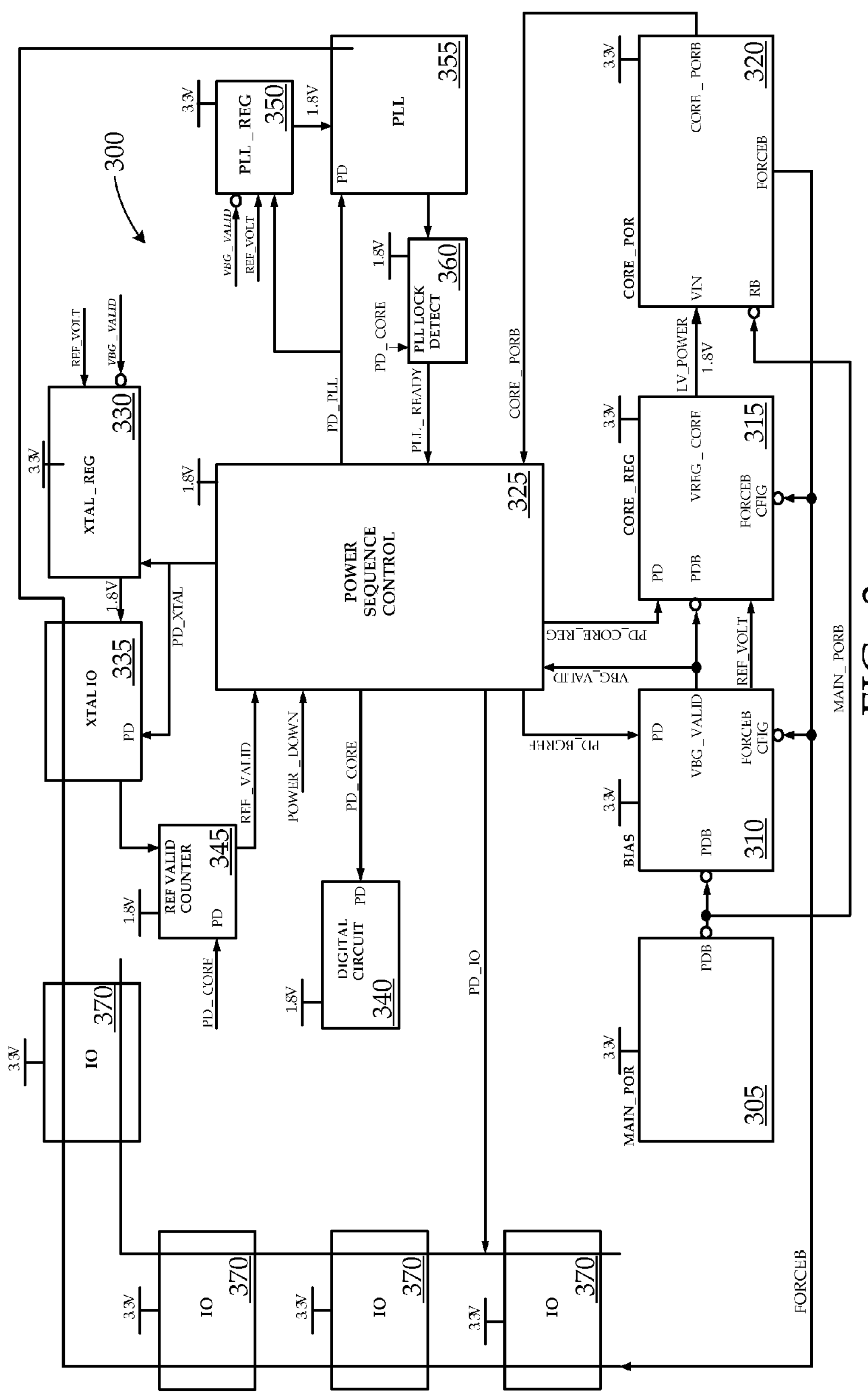
FIG. 3 is a block diagram showing an example architecture for a power sequence circuit configured according to various embodiments of the invention.

FIG. 3 is a block diagram showing an example architecture for a power sequence circuit 300 configured according to various embodiments of the invention. The circuit 300 includes a main power-on reset block (MAIN_PORB 305), a core power-on reset block (CORE_PORB 320), analog bias circuits (BIAS 310), a core regulator (CORE_REG 315), a crystal oscillator regulator (XTAL_REG 330), a phase-locked loop regulator (PLL_REG 350), and output buffers (IO 370), which may be powered by the higher voltage supply (e.g., 3.3V). The circuit also includes input reference buffers for the crystal oscillator (XTAL_IO 335), phase-locked loops (PLL 355), a reference frequency counter (REF VALID COUNTER 345), PLL lock detector (PLL LOCK DETECT 360), and other control logic, registers and output dividers (all represented by a DIGITAL CIRCUIT 340), which may be powered by the regulated voltage (e.g., 1.8V). Power sequence control block (POWER SEQUENCE CONTROL 325) is also a digital block (e.g., a 1.8V block) that controls portions of the sequence of enabling/disabling of the circuits.

The power sequence circuit 300 may be the circuit configuration 100, 200 of FIG. 1 or 2. For example, the bias circuit 310 may be the reference voltage generator 105 or bias circuit 205 of FIG. 1 or 2. The core regulator 315, crystal oscillator regulator 330, and phase-locked loop regulator 350 may be the regulators 115 of FIG. 1 or 2. The input reference buffers for the crystal oscillator 335, phase-locked loops 355, reference frequency counter 345, PLL lock detector 360, and other digital circuits 340 may be the digital modules 130 of FIG. 1 or 2). Power sequence control block 325 may be a part of the control module 110 of FIG. 1 or 2, and other functionality of the control module may be integrated into various components (e.g., the bias circuit 310 or core power-on reset block 320). Although various blocks are, in the illustrated embodiment, identified as analog or digital blocks, in other embodiments these designations may be changed. In other embodiments, there may also be different numbers of power domains, covering different combinations of components.

Figure 4:
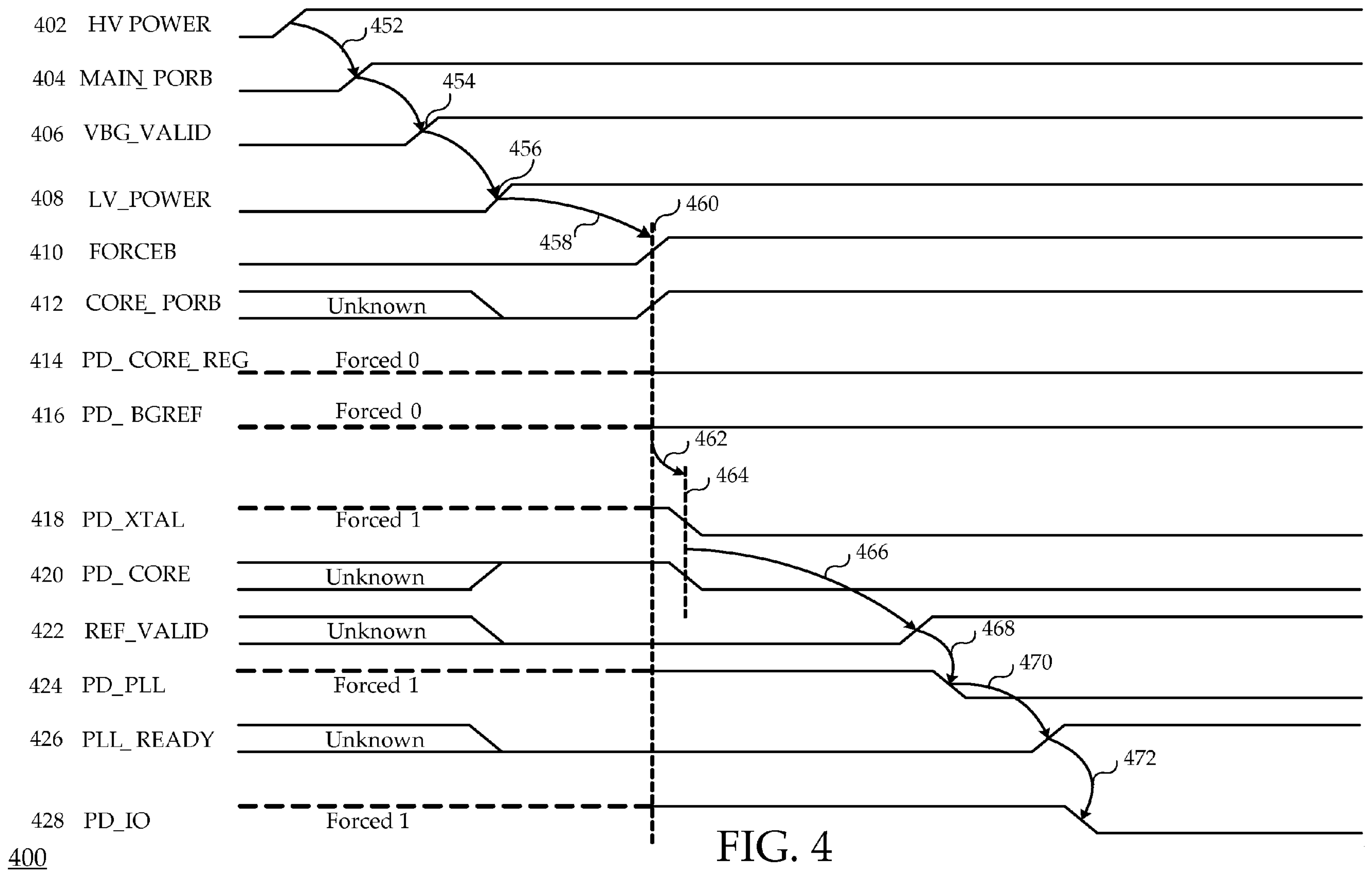
FIG. 4 is a waveform diagram of a power-on sequence according to various embodiments of the invention.

A power-up sequence will now be described with reference to FIG. 3, using the waveform diagram 400 of FIG. 4 to illustrate various control and validation signals. The x axis for the various waveforms illustrates a progression of time. This discussion will address an example signal flow that may be used to ensure proper control signals are provided during power-up to analog and digital circuits in different power domains. Although the sequence is described with reference to FIG. 3, it may be undertaken with the configurations 100, 200 of FIG. 1 or 2, as well. Power is supplied to the circuit 300 via the main power-on reset block 305 (as illustrated by the HV POWER 402 waveform of FIG. 4). When the main power-on reset block 305 detects a voltage level above a threshold level, it signals to bias circuit 310 (perhaps after a delay) that the main power is ready. This may be signaled by the MAIN_PORB 404 signal of FIG. 4 going high after the delay 452.

As a side note, the high voltage power supply also supplies the core power-on-reset block 320 upon power-up, which provides a FORCEB 410 signal to the bias circuit 310, and elsewhere. For the bias circuit 310, while the FORCEB 410 signal is low, the bias circuit 310 remains in a forced state, in which it will disregard control signals for power-down from the power sequence control block 325.

When the bias circuit 310 receives MAIN_PORB 404 which goes high, it wakes up. Bias circuit 310 upon power-up provides reference voltage (e.g., 1.8V) to the regulators 315, 330, 350. The bias circuit (or some other control module) may monitor the reference voltage to identify when it has settled substantially at 1.8V. For example, this function may be performed by monitoring when the bandgap voltage settles to a targeted value. Those skilled in the art will recognize that there are a number or ways to determine when the bias circuit 310 outputs have sufficiently settled. Upon this determination, a signal is sent to the regulators that the bias circuit 310 voltage is ready. This may be signaled by driving the VBG_VALID 406 signal high 454. This VBG_VALID 406 signal may be distributed to the core regulator 315, crystal oscillator regulator 330, and PLL regulator 350. When VBG_VALID 406 signal is low, the core regulator 315, crystal oscillator regulator 330, and PLL regulator 350 are forced to a disabled state. When the VBG_VALID 406 signal is driven high 454, the regulators 315, 330, 350 are enabled.

The high voltage power supply (e.g. 3.3V) also supplies the regulators 315, 330, 350, but it is worth discussing core regulator 315 more specifically. The FORCEB 410 signal is also provided to the core regulator 315. For the core regulator 315, while the FORCEB 410 signal is low, the core regulator 315 remains in a forced state, in which it will disregard control signals for power-down from the power sequence control block 325. However, the core regulator 315 will not become enabled until the VBG_VALID 406 signal goes high.

It will then take time 456 for the regulators 315, 330, 350 to power up, and produce a stable 1.8V. Therefore, one or more of the regulators 315, 330, 350 will be monitored 458, separately or in combination, to determine when the regulated power has stabilized. In one embodiment, only the regulated voltage of the core regulator 315 is monitored; in other embodiments, all or a subset of the regulators are monitored. Regardless, when a determination is made that the regulated voltage has reached 1.8V and/or has sufficiently stabilized, LV_POWER 408 signal from core regulator 315 to the core power-on reset block 320 is driven high. Once the core power-on reset block 320 receives an LV_POWER 408 signal driven high (and, perhaps after some delay 458), a number of forced states are released. Thus, at time 460, the FORCEB 410 and CORE_PORB 412 signals are driven high.

First, addressing the FORCEB 410 signal, when it is low it is holding output buffers 370, XTAL_IO 335 buffer, and PLL 355 in disabled states. Recall from above, for the core regulator 315 and the bias circuit 310, while the FORCEB 410 signal is low, the core regulator 315 and the bias circuit 310 remain in a forced state, in which they will disregard erroneous control signals for power-down from the power sequence control block 325. Once the FORCEB 410 signal is driven high, output buffers 370, XTAL_IO 335 buffer, PLL 355, core regulator 315 and the bias circuit 310 are released from their forced states. The release of these circuits allows (but does not mandate) these blocks to be controlled by other control signals (e.g., from the power sequence control block 325). For example, PD_CORE_REG 414 and PD_BGREF 416 are power-down signals in FIG. 4 that may be generated by the power sequence control block 325 to power down the core regulator 315 and bias circuit 310, respectively. However, these signals 414 and 416 are shown in forced low states in FIG. 4 corresponding to the low of the FORCEB 410 signal, as the FORCEB 410 signal when driven low dictates that these signals 414, 416 be disregarded by the core regulator 315 and bias circuit 310. When the FORCEB 410 signal is driven high, the core regulator 315 and bias circuit 310 may be controlled by the power sequence control block 325.

Additionally, the waveform diagram illustrates how output buffers 370, XTAL_IO 335 buffer, PLL 355 are forced into controlled states by the FORCEB 410 signal. For example, PD_XTAL 418, PD_PLL 424, and PD_IO 428 are power down signals in FIG. 4 that may be generated by the power sequence control block 325 to power down the crystal oscillator, PLL, and IO buffers. These signals 418, 424, and 428 are shown in forced high states in FIG. 4 corresponding to the low of the FORCEB 410 signal, as the FORCEB 410 signal when driven low dictates that these blocks (output buffers 370, XTAL_IO 335 buffer, PLL 355) must remain in power-down mode. It is worth mentioning that when FORCEB 410 is driven high, output buffers 370, XTAL_IO 335 buffer, PLL 355, core regulator 315, bias circuit 310 do not necessarily change states in this embodiment; instead, they are simply released from the forced state.

Next, addressing the CORE_PORB 412 signal, when it is low it is holding the power sequence control block 325, XTAL reference valid counter 345, PLL lock detect 360, and other digital circuitry 340 (e.g., other control logic, registers, and output dividers) in disabled states. Once the CORE_PORB 412 signal is driven high, power sequence control block 325, XTAL reference valid counter 345, and PLL lock detect 360 are released from their forced states. Power sequence control block 325 initiates wake-up. The release of the remainder of these blocks allows (but does not mandate) XTAL reference valid counter 345 and PLL lock detect 360 to be controlled by other control signals (e.g., from the power sequence control block 325). Power sequence control block 325, XTAL reference valid counter 345, PLL lock detect 360, and other digital circuitry 340 are low power blocks, all powered by the core regulator 315.

During time 462, power sequence control block 325 may be powering up (or there may be a delay for other reasons). On or about the time 464 that power sequence control block 325 is powered, it drives the PD_CORE 420 and PD_XTAL 418 signals low. Driving the PD_CORE 420 signal low dictates that XTAL reference valid counter 345, PLL lock detect 360, and other digital circuitry 340 will not be in power-down mode, and allows them to be powered via the regulated voltage from the core regulator 315. Driving the PD_XTAL 418 signal low dictates that the XTAL IO buffer 335 will not be in power-down mode, and allows it to be powered via the regulated voltage from the crystal oscillator regulator 330.

Due to the foregoing, the crystal oscillator becomes operational over time 466. The XTAL reference valid counter 345 monitors the output of the crystal oscillator, and drives a REF_VALID signal high when the target frequency is met and/or the frequency has stabilized past a threshold. The power sequence control block 325 receives and processes this REF_VALID 422 signal over time 468, and then drives the PD_PLL 424 signal low. Driving the PD_PLL 424 signal low dictates that the PLL 355 will not be in power-down mode, and allows it to be powered via the regulated voltage from the PLL regulator 350.

Due to the foregoing, the PLL 355 becomes operational over time 470, utilizing an output of the crystal oscillator. The PLL lock detect 360 monitors the output of the PLL 355, and drives a PLL_READY 426 signal high when the target frequency is met and/or the frequency has stabilized past a threshold. The PLL output may be used as a clock, or may be further processed and/or combined with other signals for use as a clock. The power sequence control block 325 receives and processes this PLL_READY 426 signal over time 472, and then drives the PD_IO 428 signal low to enable the output buffers 370.

A power-down assertion and a power-down de-assertion sequence will now be described with reference to FIG. 3, using the waveform diagram 500 of FIG. 5 to illustrate various control and validation signals. The x axis for the various waveforms illustrates the progression of time. This discussion will address an example signal flow that may be used to ensure proper control signals are provided during power-down to analog and digital circuits in different power domains. Power-down is a function that makes it possible to shut down the functionality of the chip and decrease the current consumption without cutting the power supply. This feature may be useful in battery operated systems (e.g., mobile devices) where power saving may be more important.

Entering into power-down mode (power-down assertion 550) shuts down certain internal circuits to decrease current consumption. As described previously with reference to the circuit 300 of FIG. 3, there are circuits in different power domains that are dependent on control signals. Proper sequence when entering power-down mode may help to ensure control signals are in a valid state and avoid improper functional behavior and/or lock-up situations. Getting out of power-down mode (power-down de-assertion 575) may entail enabling the powered-down circuits in proper sequence, similar to power-up mode, the difference here being that power supply is already in place.

Figure 5:
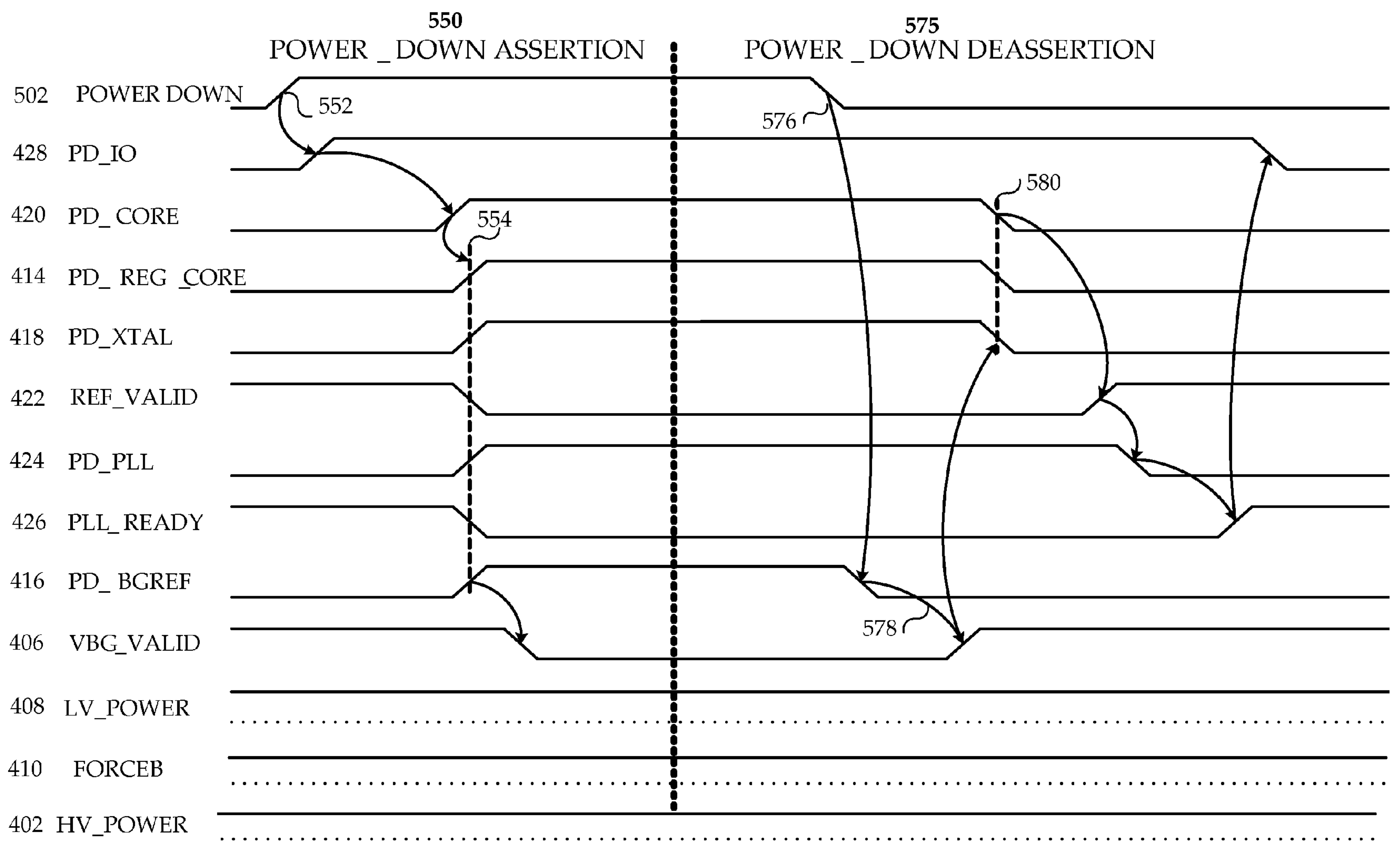
FIG. 5 is a waveform diagram of power-down related sequences according to various embodiments of the invention.

FIG. 5 describes an example signal flow used to ensure proper control signals are provided to analog and digital circuits that are in different power domains during power-down assertion and de-assertion. It is worth noting that, in some embodiments, only parts of the power-down mode (power-down assertion and de-assertion) are used. In one embodiment, at or about time 552, a POWER_DOWN 502 signal is driven high to request entry into the power-down mode. This indicates that certain blocks will power-down even as HV_POWER 402 remains available. Power sequence control block 325 may then drive PD_IO 428 signal high to turn off the output buffers 370. When all the outputs are turned off, PD_CORE 420 signal is driven high to disable low voltage digital blocks. This will cause a number of functions to occur at or about time 554. PD_REG_CORE 414 signal puts core regulator 315 into low current mode (core regulator 315 is not fully shut down to maintain the voltage level necessary to preserve the register contents). PD_XTAL 418 signal is driven high to disable XTAL_IO 335 and XTAL_REG 330 (thereby causing REF_VALID 422 signal to go low), PD_PLL 424 signal is driven high to disable PLL 355 and PLL_REG 350 (thereby causing PLL_READY 426 signal to go low), and PD_BGREF 416 signal is driven high to disable the bias circuit 310. The VBG_VALID 406 signal then goes down indicating that bias circuit 310 is disabled. The chip is now in a low power mode where certain internal circuits are powered down.

It is worth noting that LV_POWER 408 signal remains high, because the core regulator may continue to output low voltage power (operating in low current mode). Power sequence control block 325 may, therefore, remain powered, which can remove the problems at initial power-up with faulty signals coming from the power sequence control block 325. This can allow the FORCEB 410 signal to remain high.

For power-down de-assertion 575, at or about time 576, the system drives POWER_DOWN signal low to wake up the system. As described above, core regulator 315 is still functioning (in low power mode), and power sequence control block 325 is functional at this point. PD_BGREF signal 416 is driven low to enable the bias circuit 310. After a stabilization period 578, VBG_VALID 406 signal goes high (as described for the waveform 400 of FIG. 4). Then PD_CORE 420, PD_REG_CORE 414 and PD_XTAL 418 signals are driven low at or about time 580 (e.g., as generally described for the waveform 400 of FIG. 4). Driving the PD_CORE 420 signal low dictates that XTAL reference valid counter 345, PLL lock detect 360, and other digital circuitry 340 will not be in power-down mode, and allows them to be powered via the regulated voltage from the core regulator 315. A low PD_REG_CORE 414 signal switches core regulator into full power mode, and a low PD_XTAL enables XTAL_IO 335. XTAL_IO 335 buffer proceeds to generate the proper reference frequency, which drives REF_VALID 422 signal high. The high REF_VALID 422 signal causes PD_PLL 424 signal to be driven low to activate the PLL 355. When PLL 355 is ready (locked to the target frequency), PLL_READY 426 goes high, and then PD_IO 428 is driven low to enable output buffers 370.

It is worth noting that although the power-down mode is described with reference to FIG. 3, it may also be performed, for example, with the configurations described with reference to FIG. 1A, 1B, 2, 3A, or 3B of U.S. patent application Ser. No. 12/421,739, now U.S. Pat. No. 7,705,575, filed concurrently herewith, entitled "STANDBY REGULATOR", which is hereby incorporated by reference, as if set forth in full in this document, for all purposes.

Figure 6:
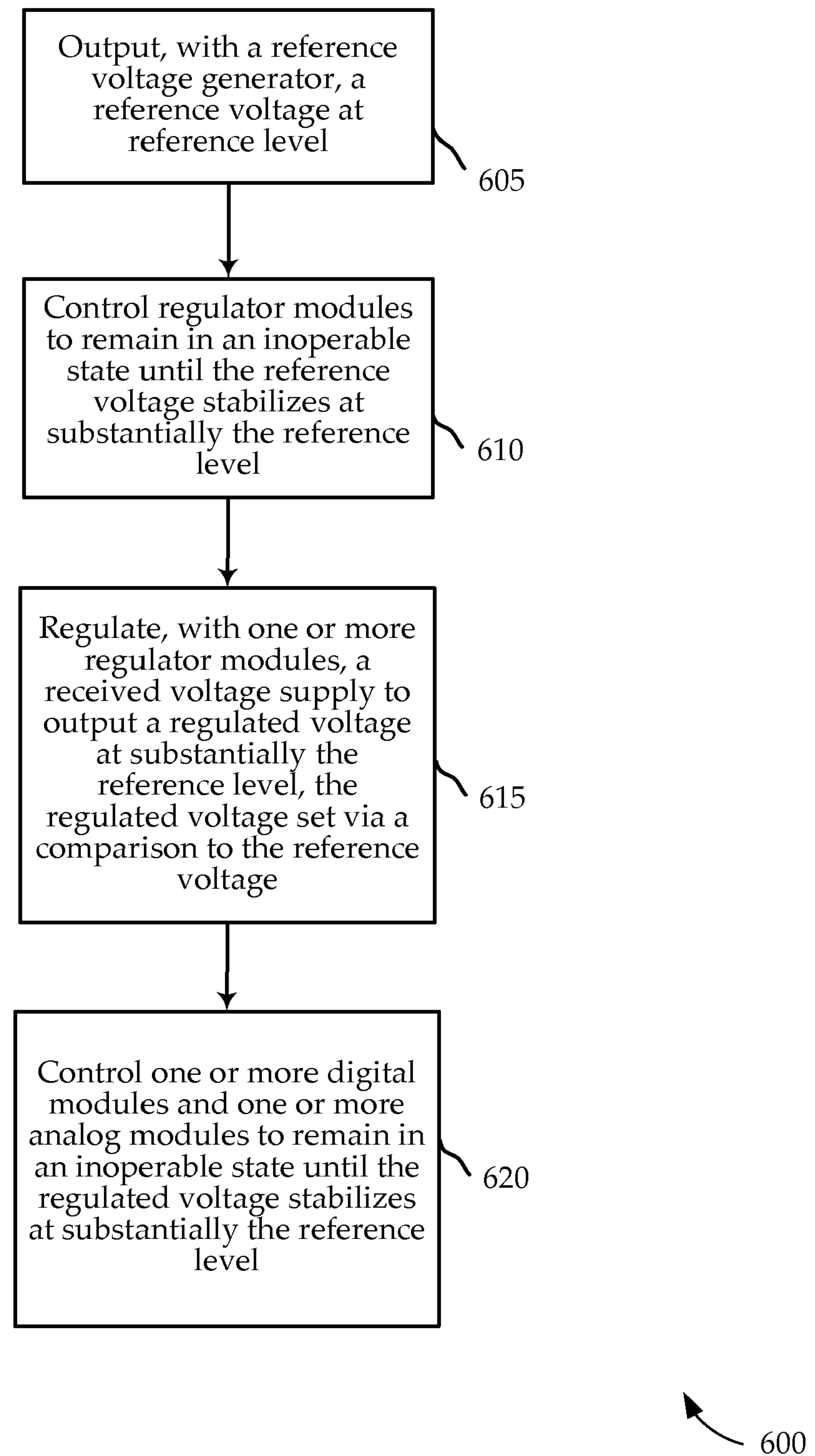
FIG. 6 is a flowchart illustrating a method for controlling a power-on sequence according to various embodiments of the invention.

FIG. 6 is a flowchart illustrating a method 600 for controlling a power-on sequence according to various embodiments of the invention. The method 600 may, for example, be performed in whole or in part using the configuration 100, 200 of FIG. 1 or 2, or the circuit 300 of FIG. 3.

At block 605, a reference voltage generator outputs a reference voltage at a reference level. At block 610, regulator modules are controlled to remain in an inoperable state until the reference voltage stabilizes at substantially the reference level. At block 615, a received voltage supply is regulated by one or more regulator modules to output a regulated voltage at substantially the reference level, the regulated voltage being set via a comparison to the reference voltage. At block 620, one or more digital modules and one or more analog modules are controlled to remain in an inoperable state until the regulated voltage stabilizes at substantially the reference level.

Figure 7:
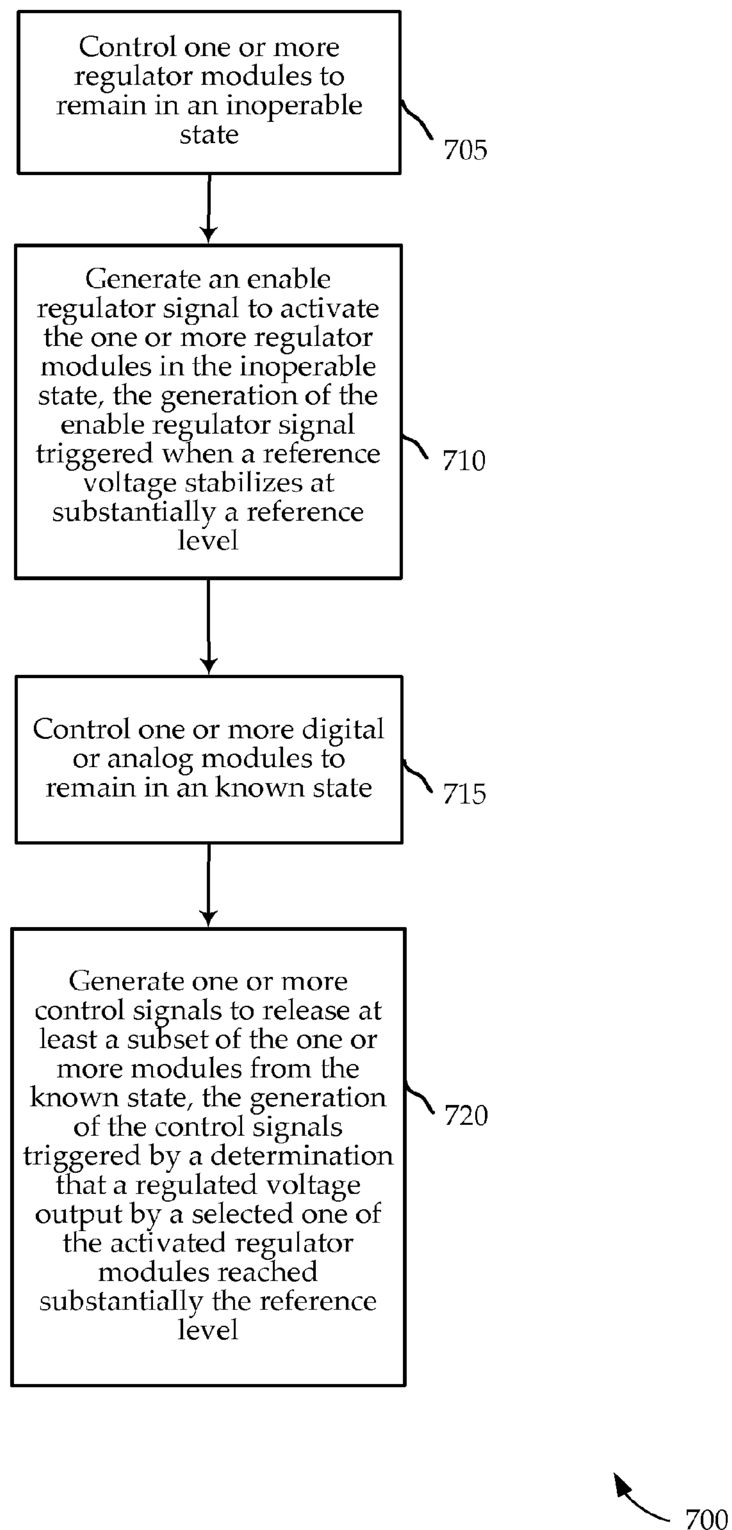
FIG. 7 is a flowchart illustrating a method for controlling the operational frequency of an oscillator according to various embodiments of the invention.

FIG. 7 is a flowchart illustrating a method 700 for controlling the operational frequency of an oscillator according to various embodiments of the invention. The method 700 may, for example, be performed in whole or in part using the configuration 100, 200 of FIG. 1 or 2, or the circuit 300 of FIG. 3.

At block 705, one or more regulator modules are controlled to remain in an inoperable state. At block 710, an enable regulator signal is generated to activate the one or more regulator modules from the inoperable state, the generation of the enable regulator signal being triggered when a reference voltage stabilizes at substantially a reference level. At block 715, one or more digital or analog modules are controlled to remain in a known state. At block 720, one or more control signals are generated to release at least a subset of the one or more modules from the known state, the generation of the control signals being triggered by a determination that a regulated voltage output by a selected one of the activated regulator modules has reached substantially the reference level.

Figure 8:
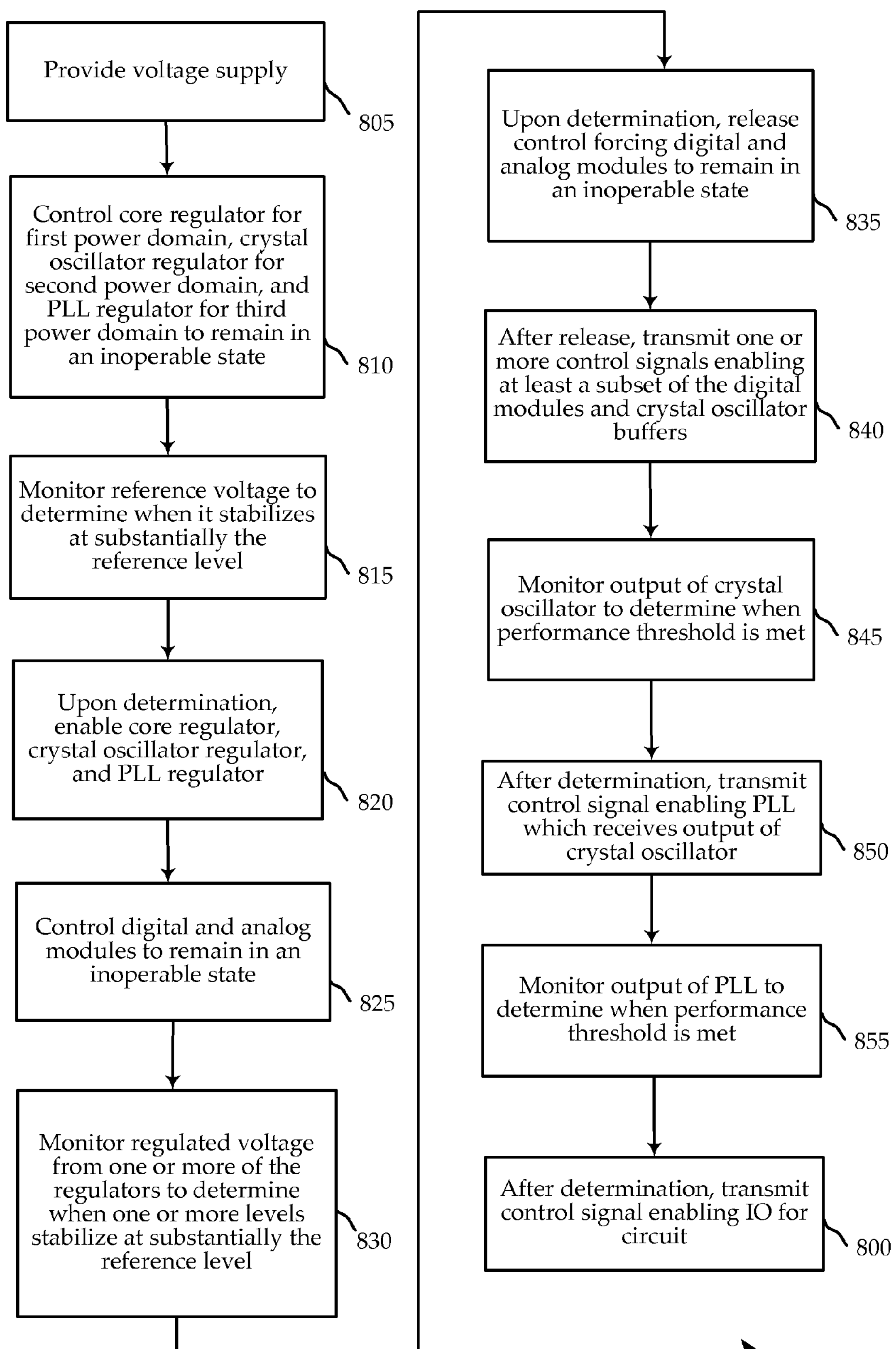
FIG. 8 is a flowchart illustrating a method for controlling the power-on sequence for components of a clock generator according to various embodiments of the invention.

FIG. 8 is a flowchart illustrating a method 800 for controlling the power-on sequence for components of a clock generator according to various embodiments of the invention. The method 800 may, for example, be performed in whole or in part using the configuration 100, 200 of FIG. 1 or 2, or the circuit 300 of FIG. 3.

At block 805, a voltage supply is provided. At block 810, a core regulator for a first power domain, a crystal oscillator regulator for a second power domain, and a PLL regulator for a third power domain are controlled to remain in an inoperable state. At block 815, reference voltage is monitored to determine when it stabilizes at substantially a reference level. At block 820, upon the reference voltage determination, the core regulator, the crystal oscillator regulator, and the PLL regulator are enabled.

At block 825, digital and analog modules are controlled to remain in an inoperable state. At block 830, the regulated voltage from one or more of the regulators is monitored to determine when one or more levels stabilize at substantially the reference level. At block 835, upon the regulated voltage determination, the control forcing digital and analog modules to remain in an inoperable state is released.

At block 840, after release of the digital and analog modules, one or more control signals is transmitted enabling at least a subset of the digital modules and a crystal oscillator. At block 845, output of the crystal oscillator is monitored to determine when a performance threshold is met. At block 850, upon the output determination for the crystal oscillator, a control signal is transmitted enabling a PLL which receives the output of the crystal oscillator. At block 855, output of the PLL is monitored to determine when a performance threshold is met. At block 860, upon the output determination for the PLL, a determination is made to transmit the control signal enabling the IO for the circuit.

It is worth noting that any of the functionality described with reference to FIG. 1, 2 or 3 may be implemented on one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A circuit with a power-up sequence, the circuit comprising:

a reference voltage generator configured to output a reference voltage at a second voltage level lower than a voltage supply at a first voltage level;

one or more regulator modules, coupled with the reference voltage generator, and configured to:

receive voltage supply at substantially the first voltage level; and regulate the received voltage supply to output a regulated voltage at substantially the second voltage level, the regulated voltage level set via a comparison to the reference voltage;

one or more digital modules, coupled with at least a subset of the one or more regulator modules, and configured to be powered via the regulated voltage;

one or more analog modules, coupled with the one or more digital modules, and configured to:

receive voltage supply at substantially the first voltage level; and receive control signals from the one or more digital modules; and a control module, communicatively coupled with the one or more regulator modules, one or more digital modules, and one or more analog modules, and configured to:

control at least a subset of the one or more regulator modules to remain in an inoperable state until the reference voltage stabilizes at substantially the second voltage level; and control at least a subset of the one or more digital modules or at least a subset of the one or more analog modules to remain in an inoperable state until the regulated voltage level stabilizes at substantially the second voltage level.

2. The circuit of claim 1, wherein the control module is further configured to prevent one or more power-down operations from occurring at a second set of analog modules until the regulated voltage level stabilizes at substantially the second voltage level.

3. The circuit of claim 2, wherein the second set of analog modules comprises the reference voltage generator and a selected one of the regulator modules.

4. The circuit of claim 1, wherein the one or more regulator modules comprise a core regulator supplying a first power domain configured to provide the regulated voltage to a plurality of digital subcircuits.

5. The circuit of claim 4, wherein the one or more regulator modules further comprise: a crystal oscillator regulator supplying a second power domain configured to provide the regulated voltage for control of a crystal oscillator; and a phase-locked loop regulator supplying a third power domain configured to provide the regulated voltage for a phase-locked loop.

6. The circuit of claim 5, wherein the control module is configured to: monitor the regulated voltage of the core regulator, the crystal oscillator regulator, and the phase-locked loop regulator to determine when the regulated voltage from each stabilizes at substantially the second voltage level; and transmit one or more control signals to activate the one or more digital modules and the one or more analog modules.

7. The circuit of claim 1, wherein the control module is configured to transmit a control signal at a first level to the one or more regulator modules to control the one or more regulator modules to remain in an inoperable state.

8. The circuit of claim 7, wherein the control module is configured to transmit the control signal at a second level to the one or more regulator modules to release the control forcing the one or more regulator modules to remain in an inoperable state.

9. The circuit of claim 1, wherein the control module is configured to transmit a first control signal to control the one or more digital modules to remain in an inoperable state; and wherein the control module is configured to transmit a second control signal to control the one or more analog modules to remain in an inoperable state.

10. The circuit of claim 9, wherein, the reference voltage generator is further configured to receive the second control signal, wherein the second control signal further prevents one or more power-down operations from occurring at the reference voltage generator.

11. The circuit of claim 9, wherein the control module is further configured to:

determine when the regulated voltage level stabilizes at substantially the second voltage level;

transmit, based on the determination, the first control signal at a changed level to release the control forcing the one or more digital modules to remain in an inoperable state; and transmit, based on the determination, the second control signal at a changed level to release the control forcing the one or more analog modules to remain in an inoperable state.

12. The circuit of claim 11, wherein after the first control signal is transmitted at the changed level the second control signal is transmitted at the changed level, a third control signal is transmitted to enable a crystal oscillator to generate an output; and a fourth control signal is transmitted to enable a reference valid counter configured to monitor the output of the crystal oscillator, wherein the one or more digital modules include the reference valid counter.

13. The circuit of claim 12, wherein the reference valid counter is further configured to:

determine when an output of the crystal oscillator exceeds a threshold performance measurement; and transmit, after the threshold determination for the crystal oscillator output, a fifth control signal causing a phased-locked loop receiving the crystal oscillator output to be enabled.

14. The circuit of claim 13, wherein, a phase-locked loop detector monitors an output of the phase-locked loop to determine when the output exceeds a threshold performance measurement, wherein the one or more digital modules include the phase-locked loop detector; and the phase-locked loop detector is configured to transmit, after the threshold determination for the crystal oscillator output, a sixth control signal causing output buffers to be enabled.

15. The circuit of claim 1, wherein the one or more regulators include a core regulator, and the core regulator is configured to be switched into low power mode to maintain register contents in a power-down mode for the circuit.

16. The circuit of claim 1, wherein the circuit comprises a clock generator circuit; where the reference voltage generator comprises a bias circuit that comprises at least a part of the control module; and where the circuit further comprises a phase-locked loop having an output, the output of the phase locked loop comprising a clock signal.

17. A method for sequencing power-up in a circuit, the method comprising:

outputting, with a reference voltage generator, a reference voltage at a second voltage level lower than a voltage supply at a first voltage level;

receiving the voltage supply at one or more regulator modules coupled to the reference voltage generator, the voltage supply being substantially at the first voltage level;

controlling at least a subset of the one or more regulator modules to remain in an inoperable state until the reference voltage stabilizes at substantially the second voltage level;

regulating, with the one or more regulator modules, the received voltage supply to output a regulated voltage at substantially the second voltage level, the regulated voltage set via a comparison to the reference voltage; and controlling at least a subset of one or more digital modules or at least a subset of one or more analog modules to remain in an inoperable state until the regulated voltage stabilizes at substantially the second voltage level.

18. The method of claim 17, further comprising controlling a second set of one or more digital modules to remain in known state preventing power-down until the regulated voltage stabilizes at substantially the second voltage level.

19. The method of claim 17, wherein the one or more regulator modules include:

a core regulator in a first power domain configured to provide a first regulated voltage to a plurality of digital subcircuits;

a crystal oscillator regulator in a second power domain configured to provide a second regulated voltage for control of a crystal oscillator; and a phase-locked loop regulator in a third power domain configured to provide a third regulated voltage for control of a phase-locked loop.

20. The method of claim 17, further comprising:

monitoring the regulated voltage to determine when the regulated voltage stabilizes at substantially the second voltage level; and transmitting one or more control signals to activate the one or more digital modules and the one or more analog modules.

21. The method of claim 17, wherein controlling the at least a subset of one or more regulator modules to remain in an inoperable state comprises:

transmitting a control signal at a first level to the one or more regulator modules.

22. The method of claim 21, further comprising:

releasing the control forcing at least a subset of the one or more regulator modules to remain in an inoperable state by transmitting the control signal at a second level to the one or more regulator modules.

23. The method of claim 17, wherein the controlling of at least a subset of the one or more digital modules and at least a subset of the one or more analog modules to remain in an inoperable state until the regulated voltage stabilizes at substantially the second voltage level comprises:

controlling the at least a subset of the one or more digital modules by transmitting a first control signal; and controlling the at least a subset of the one or more analog modules by transmitting a second control signal.

24. The method of claim 17, further comprising:

determining when the regulated voltage level stabilizes at substantially the second voltage level;

transmitting, based on the determination, a first control signal at a changed level to release the control forcing the at least a subset of the one or more digital modules to remain in an inoperable state; and transmitting, based on the determination, a second control signal at a changed level to release the control forcing the at least a subset of the one or more analog modules to remain in an inoperable state.

25. The method of claim 24, wherein, the reference voltage generator is further configured to receive the second control signal at the changed level, wherein the second control signal at the changed level prevents one or more power-down operations from occurring at the reference voltage generator.

26. The method of claim 17, further comprising:

activating the at least a subset of the one or more digital modules in the inoperable state, the generation of the control signals triggered by a determination that a regulated voltage output by a selected one of the activated regulator modules reached substantially the second voltage level;

enabling, after the activating step, a crystal oscillator; and enabling, after the activating step, a reference valid counter configured to monitor an output of the crystal oscillator, wherein the at least a subset of the one or more digital modules include the reference valid counter.

27. The method of claim 17, further comprising:

determining when an output of a crystal oscillator exceeds a threshold performance measurement; and enabling, after the threshold determination for the crystal oscillator output, a silicon oscillator receiving the crystal oscillator output.

28. A circuit with a power-up sequence, the circuit comprising:

a bias circuit configured to:

output a reference voltage at a second level lower than a voltage supply at a first level; and output an enable regulator signal when bias current reaches a threshold value;

one or more regulator modules, coupled with the bias circuit, and configured to:

become operable after receiving the enable regulator signal;

receive the voltage supply at substantially the first voltage level;

regulate the received voltage supply to output a regulated voltage at substantially the second voltage level, the regulated voltage level set via a comparison to the reference voltage; and a control module, coupled with the one or more regulator modules, and configured to:

monitor the regulated voltage level to determine when the regulated voltage stabilizes at substantially the second voltage level; and transmit one or more control signals to activate one or more digital or analog modules, the transmission triggered by the determination that the regulated voltage is stabilized at substantially the second voltage level; and where the control module is further configured to:

control at least a subset of the one or more regulator modules to remain in an inoperable state until the reference voltage stabilizes at substantially the second voltage level; and control at least a subset of the one or more digital modules or at least a subset of the one or more analog modules to remain in an inoperable state until the regulated voltage level stabilizes at substantially the second voltage level.

29. The circuit of claim 28, wherein, the bias circuit is further configured to control the one or more regulator modules to remain in an inoperable state until the bias current reaches the threshold value; and the control module is further configured to control at least a subset of the one or more digital modules and at least a subset of the one or more analog modules to remain in an inoperable state until the regulated voltage level stabilizes at substantially the second voltage level.

30. A method for sequencing power-up in a circuit, the method comprising:

receiving a voltage supply at one or more regulator modules, the voltage supply being substantially at a first voltage level;

controlling the one or more regulator modules to remain in an inoperable state;

generating an enable regulator signal to activate the one or more regulator modules in the inoperable state, the generation of the enable regulator signal triggered when a reference voltage stabilizes at substantially a second voltage level that is lower than the voltage supply at substantially the first voltage level;

controlling one or more digital modules or one or more analog modules to remain in an inoperable state; and generating one or more control signals to release at least a subset of the one or more digital modules or at least a subset of the one or more analog modules from the inoperable state, the generation of the control signals triggered by a determination that a regulated voltage output by a selected one of the activated regulator modules is stabilized at substantially the second voltage level.

31. The method of claim 30, wherein the controlling the one or more digital modules and one or more analog modules to remain in the inoperable state comprises:

generating a control signal, wherein the control signal also controls a reference voltage generator to operate in a state preventing one or more power-down signals from powering down the reference voltage generator.

* * * * *